United States Patent [19]

Jayakumar

[11] Patent Number: 5,511,200
[45] Date of Patent: Apr. 23, 1996

[54] METHOD AND APPARATUS FOR PROVIDING AN ENHANCED PROGRAMMABLE PRIORITY INTERRUPT CONTROLLER

[75] Inventor: Muthurajan Jayakumar, Folsom, Calif.

[73] Assignee: Intel Corporation, Santa Clara, Calif.

[21] Appl. No.: 160,387

[22] Filed: Dec. 1, 1993

[51] Int. Cl.$^6$ .................................................. G06F 9/46
[52] U.S. Cl. ................................. 395/739; 395/742
[58] Field of Search ........................... 395/725, 325, 395/739, 742, 870

[56] References Cited

U.S. PATENT DOCUMENTS

| | | | |
|---|---|---|---|
| 5,101,497 | 3/1992 | Culley et al. | 395/725 |
| 5,261,107 | 11/1993 | Klim et al. | 395/725 |
| 5,283,904 | 2/1994 | Carson et al. | 395/725 |
| 5,410,710 | 4/1995 | Sarangdhar | 395/725 |

*Primary Examiner*—Glenn A. Auve
*Attorney, Agent, or Firm*—Blakely, Sokoloff, Taylor & Zafman

[57] ABSTRACT

An improved APIC controller which utilizes an improved addressing mechanism for interrupts which provides an additional bit position for priority values so that thirty-two levels of priority may be furnished at sequential addresses within an interrupt vector table in memory. In one embodiment, circuitry is furnished which allows the alternative implementation of either a prior art addressing mechanism or the improved addressing mechanism.

21 Claims, 5 Drawing Sheets

Figure 3 (Prior Art)

Priority

| MSB | LSB |
|---|---|
| 7    4 | 3    0 |
| 1 1 1 1 | 1 1 1 1 |
| 1 1 1 1 | 1 1 1 0 |
| 1 1 1 1 | 1 1 0 1 |
| 1 1 1 1 | 1 1 0 0 |
| 1 1 1 1 | 1 0 1 1 |
| 1 1 1 1 | 1 0 1 0 |
| 1 1 1 1 | 1 0 0 1 |
| 1 1 1 1 | 1 0 0 0 |
| 1 1 1 1 | 0 1 1 1 |
| 1 1 1 1 | 0 1 1 0 |
| 1 1 1 1 | 0 1 0 1 |
| 1 1 1 1 | 0 1 0 0 |
| 1 1 1 1 | 0 0 1 1 |
| 1 1 1 1 | 0 0 1 0 |
| 1 1 1 1 | 0 0 0 1 |
| 1 1 1 1 | 0 0 0 0 |
| 1 1 1 0 | 1 1 1 1 |
| 1 1 1 0 | 1 1 1 0 |
| 1 1 1 0 | 1 1 0 1 |
| 1 1 1 0 | 1 1 0 0 |
| 1 1 1 0 | 1 0 1 1 |
| 1 1 1 0 | 1 0 1 0 |
| 1 1 1 0 | 1 0 0 1 |

| 0 0 0 0 | 1 0 0 0 |
| 0 0 0 0 | 0 1 1 1 |
| 0 0 0 0 | 0 1 1 0 |
| 0 0 0 0 | 0 1 0 1 |
| 0 0 0 0 | 0 1 0 0 |
| 0 0 0 0 | 0 0 1 1 |
| 0 0 0 0 | 0 0 1 0 |
| 0 0 0 0 | 0 0 0 1 |
| 0 0 0 0 | 0 0 0 0 |

Figure 5

Priority

| MSB | | LSB |
|---|---|---|
| 7    5 | 4 | 0 |
| 1 1 1 | 1 | 1 1 1 1 |
| 1 1 1 | 1 | 1 1 1 0 |
| 1 1 1 | 1 | 1 1 0 1 |
| 1 1 1 | 1 | 1 1 0 0 |
| 1 1 1 | 1 | 1 0 1 1 |
| 1 1 1 | 1 | 1 0 1 0 |
| 1 1 1 | 1 | 1 0 0 1 |
| 1 1 1 | 1 | 1 0 0 0 |
| 1 1 1 | 1 | 0 1 1 1 |
| 1 1 1 | 1 | 0 1 1 0 |
| 1 1 1 | 1 | 0 1 0 1 |
| 1 1 1 | 1 | 0 1 0 0 |
| 1 1 1 | 1 | 0 0 1 1 |
| 1 1 1 | 1 | 0 0 1 0 |
| 1 1 1 | 1 | 0 0 0 1 |
| 1 1 1 | 1 | 0 0 0 0 |
| 1 1 1 | 0 | 1 1 1 1 |
| 1 1 1 | 0 | 1 1 1 0 |
| 1 1 1 | 0 | 1 1 0 1 |
| 1 1 1 | 0 | 1 1 0 0 |
| 1 1 1 | 0 | 1 0 1 1 |
| 1 1 1 | 0 | 1 0 1 0 |
| 1 1 1 | 0 | 1 0 0 1 |

| 0 0 0 | 0 | 1 0 0 0 |
| 0 0 0 | 0 | 0 1 1 1 |
| 0 0 0 | 0 | 0 1 1 0 |
| 0 0 0 | 0 | 0 1 0 1 |
| 0 0 0 | 0 | 0 1 0 0 |
| 0 0 0 | 0 | 0 0 1 1 |
| 0 0 0 | 0 | 0 0 1 0 |
| 0 0 0 | 0 | 0 0 0 1 |
| 0 0 0 | 0 | 0 0 0 0 |

METHOD AND APPARATUS FOR PROVIDING AN ENHANCED PROGRAMMABLE PRIORITY INTERRUPT CONTROLLER

BACKGROUND OF THE INVENTION

1. Field Of The Invention

This invention relates to computer systems and, more particularly, to methods and apparatus for providing an improved programmable priority interrupt controller for use with modern operating systems.

2. History Of The Prior Art

Historically, computers utilizing microprocessors manufactured by Intel Corporation of Santa Clara, Calif., such as the 8088, 8086, 80186, 80286, i386™, and i486™ microprocessors (herein referred to as the Intel processors) have used an Intel 8259 programmable interrupt controller (PIC) or an interrupt controller patterned thereon. This interrupt controller provides interrupt signals to an associated processor in response to interrupt signals generated by various hardware devices associated with the processor. The priority level of an interrupt provided by a PIC controller is fixed for each associated hardware device and depends upon the input pin position on the PIC controller at which the interrupt signal is received. That is, an interrupt from the keyboard is always connected to the PIC at the same input pin position and is always transferred to the processor by the interrupt controller at a certain priority level, while an interrupt from another hardware device is always connected to the PIC at a different input pin position and is always transferred to the processor by the controller at another priority level. Thus, these priority levels are hardwired and remain constant throughout the operation of the device. In systems using a plurality of processors, such an interrupt controller is capable of furnishing interrupts to only a single one of the processors. Consequently, it has been necessary to provide software solutions to control the inter-relation of interrupts in systems using many processors.

With more advanced computers running advanced operating systems, it is desirable to be able to change the priority level at which interrupt signals from a particular hardware component are handled as the circumstances of operation change. That is, a particular hardware device may be very important in certain instances (such as when a computer system operates as a server) and less important in other circumstances (where a computer operates as a desktop computer). Therefore, it is desirable that the priority levels of particular hardware be programmable within any particular computer.

Moreover, the efficient operation of a computer system depends on the correct interrelation between the operation of the hardware and the software. Consequently, the priority levels of interrupts associated with software processes (tasks) and of interrupts from hardware devices should be coordinated and made programmable. In this way, the use of interrupts may be made to depend on the circumstances of the computer system operation taking place. More advanced operating systems provide for this coordination of hardware and task interrupt priority levels.

Recently, a new interrupt controller has been designed for use with Intel processors which is capable of accomplishing these desirable features, among others. Intel Corporation markets this interrupt controller as the 82489DX Advanced Programmable Interrupt Controller (APIC). This controller provides multiprocessor interrupt management which includes facilities for transferring interrupts between processors and to the least used one of a plurality of processors used in a multiprocessor system. This controller also provides programmable interrupts for both tasks and devices and manages their inter-relation. Such a controller is described in detail in a publication entitled 82489*DX Advanced Programmable Interrupt Controller,* published by Intel Corporation of Santa Clara, Calif.

Even though the APIC controller is a relatively new system component, it was designed at a time before it was expected that more modern operating systems would find extensive use with the Intel processors. When the APIC controller was designed, it was expected that only sixteen interrupt priority levels would be required for any of these microprocessors. Since that time, new operating systems have been written to be used with the Intel processors. Similarly, older operating systems which utilize thirty-two levels of interrupt priority have been modified so that they may be more easily used with the Intel processors. For example, the Microsoft Windows NT Operating System utilizes thirty-two levels of priority in assigning interrupts and is expected to find wider use in systems utilizing Intel processors. In order to handle these modern operating systems, software processes must be utilized to provide the necessary levels of interrupts for the Intel processors using the APIC controllers. Such software methods cause a substantial decrease in the operating speed of such systems thereby creating the possibility of loss of data.

Additionally, the APIC allows priority to be programmable by assigning a vector to each input pin. This vector is written into and maintained in a register in the APIC controller associated with an input pin at which an interrupt may appear. The vector includes a number of bits which designate the priority of the interrupt and the address in an interrupt vector table in memory of the handler process for the interrupt. The assignment of bits in the vector is such that all of the possible levels of priorities which may be assigned to any device or task are widely separated in memory rather than being associated in adjacent entries. This substantially increases the spread of the entries used in the interrupt vector table. This increase in spread interferes with entries which has been previously used by many application programs for other purposes and therefore tends to make these older application programs incompatible with the newer hardware.

SUMMARY OF THE INVENTION

It is, therefore, an object of the present invention to provide an improved programable interrupt controller capable of providing an increased number of priority levels amenable to use with more modern operating systems.

It is another, more specific, object of the present invention to modify an APIC controller to provide an improved programmable interrupt controller which provides an increased number of priority levels which may be addressed more rapidly in operation.

These and other objects of the present invention are realized in an improved APIC controller which utilizes an improved addressing mechanism for interrupts which provides an additional bit position for priority values so that thirty-two levels of priority may be furnished at sequential addresses within an interrupt vector table in memory. In one embodiment, circuitry is furnished which allows the alternative implementation of either a prior art addressing mechanism or the improved addressing mechanism.

BRIEF DESCRIPTION OF THE DRAWINGS

FIG. 3 illustrates the memory mapping of the interrupt handlers for a particular APIC controller and processor of the prior art.

FIG. 5 illustrates the memory mapping of the interrupt handlers for a particular APIC controller and processor in accordance with the present invention.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
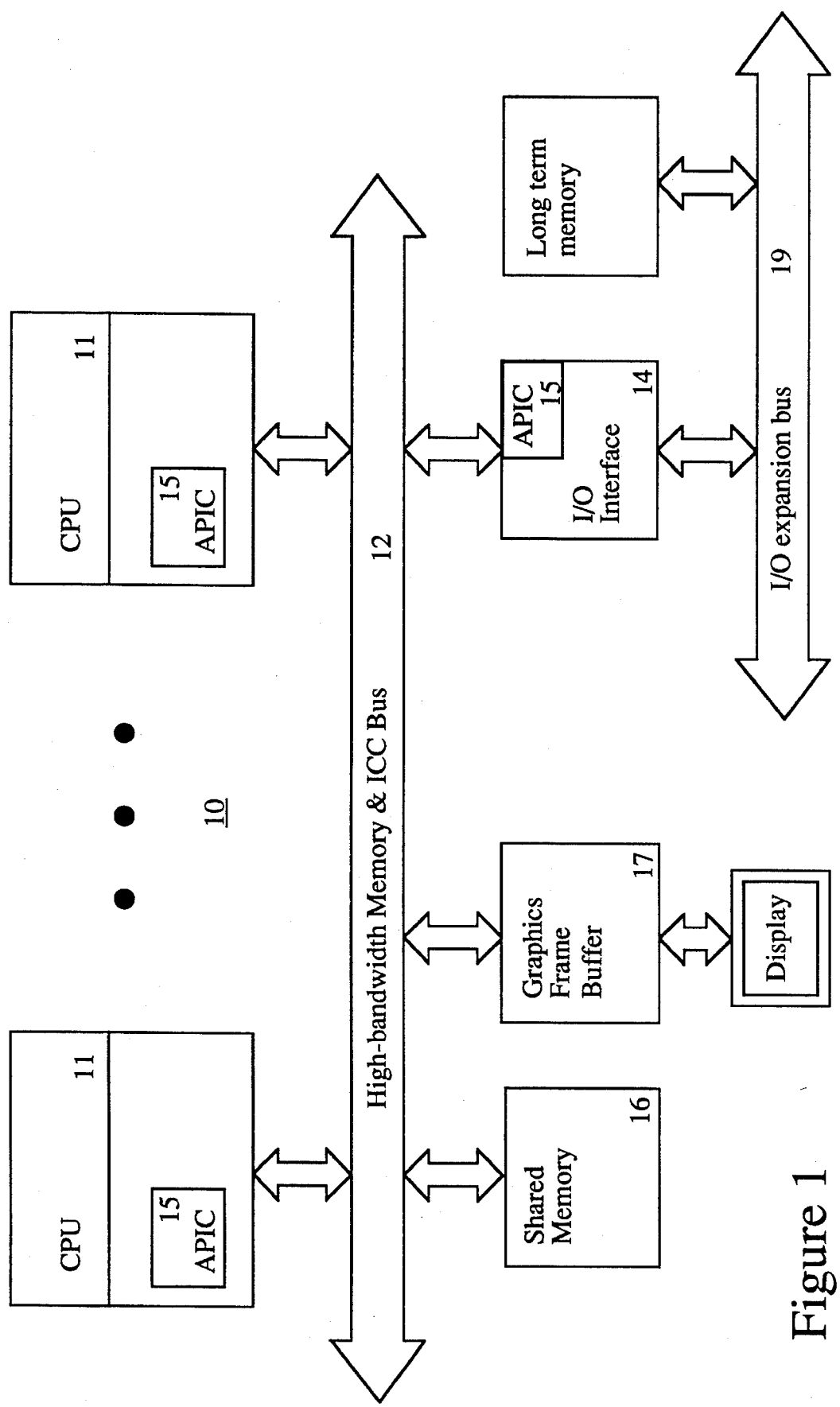
FIG. 1 is a block diagram illustrating a computer system which may utilize the present invention.

Referring now to FIG. 1, there is illustrated a computer system 10. The system 10 illustrated is a multiprocessor system which includes a plurality of central processing units 11 each arranged in a symmetric architecture in which all processors are identical and each processor can communicate with every other processor. In this architecture, each processor 11 is joined to a high-bandwidth memory and interrupt controller communication (HB&ICC) bus 12. In the arrangement illustrated, each processor 11 has associated with it an advanced programable interrupt controller (APIC) 15 which may be an Intel 82489DX controller. As will be explained, these controllers are arranged to control interrupts directed to and between the various processors 11 which are a part of the computer system 10. The primary purpose of the bus 12 illustrated in FIG. 1 is to carry data and addresses to various components of the system 10. However, the bus 12 in FIG. 1 may also be considered to include a portion referred to as an interrupt controller communication (ICC) bus which transfers signals to and between the APIC controllers 15. This is implemented by a five wire synchronous bus connecting all of the APIC controllers in the system.

Joined to the bus 12 is main memory 16 which is typically constructed of dynamic random access memory arranged in a manner well known to those skilled in the prior art to store information during a period in which power is provided to the system 10. Main memory 16 is in the illustrated architecture shared by the various processors 11. As is well known to those skilled in the art, a graphics frame buffer 17 may be connected to provide output to an output display device such as an output display monitor on which the output of the computer system 10 may be displayed. Also joined to the bus 12 is an input/output (I/O) interface unit 14. The I/O interface unit 14 is typically used for synchronizing transfers of data between the high bandwidth bus 12 and a second lower bandwidth I/O expansion bus 19. The I/O interface unit 14 illustrated includes an advanced programmable interrupt controller 15 which is utilized to assist in controlling access to the bus 12 for components on the I/O expansion bus 19. The I/O interface unit 14 is joined to the bus 12 and to the input/output expansion bus 19 to which may be connected various peripheral devices such as long term memory. The arrangement and operation of such a multiprocessor computer system is well known to those skilled in the art and is described in extensive detail in a publication entitled *An APIC-Based Symmetric Multiprocessor System Design,* Version 1, Intel Corporation, 1993.

When power is initially applied to such a system running the MS DOS operating system, a set of system basic input/output start up (BIOS) routines provide values to program the APIC controller. With more modern operating systems, a similar programming of the APIC controller circuitry associated with each processor or interface circuit takes place upon system start up. This programming includes assigning interrupt vectors which, among other things, designate the priority value assigned to each of the input terminals of each APIC controller 15.

Figure 2:
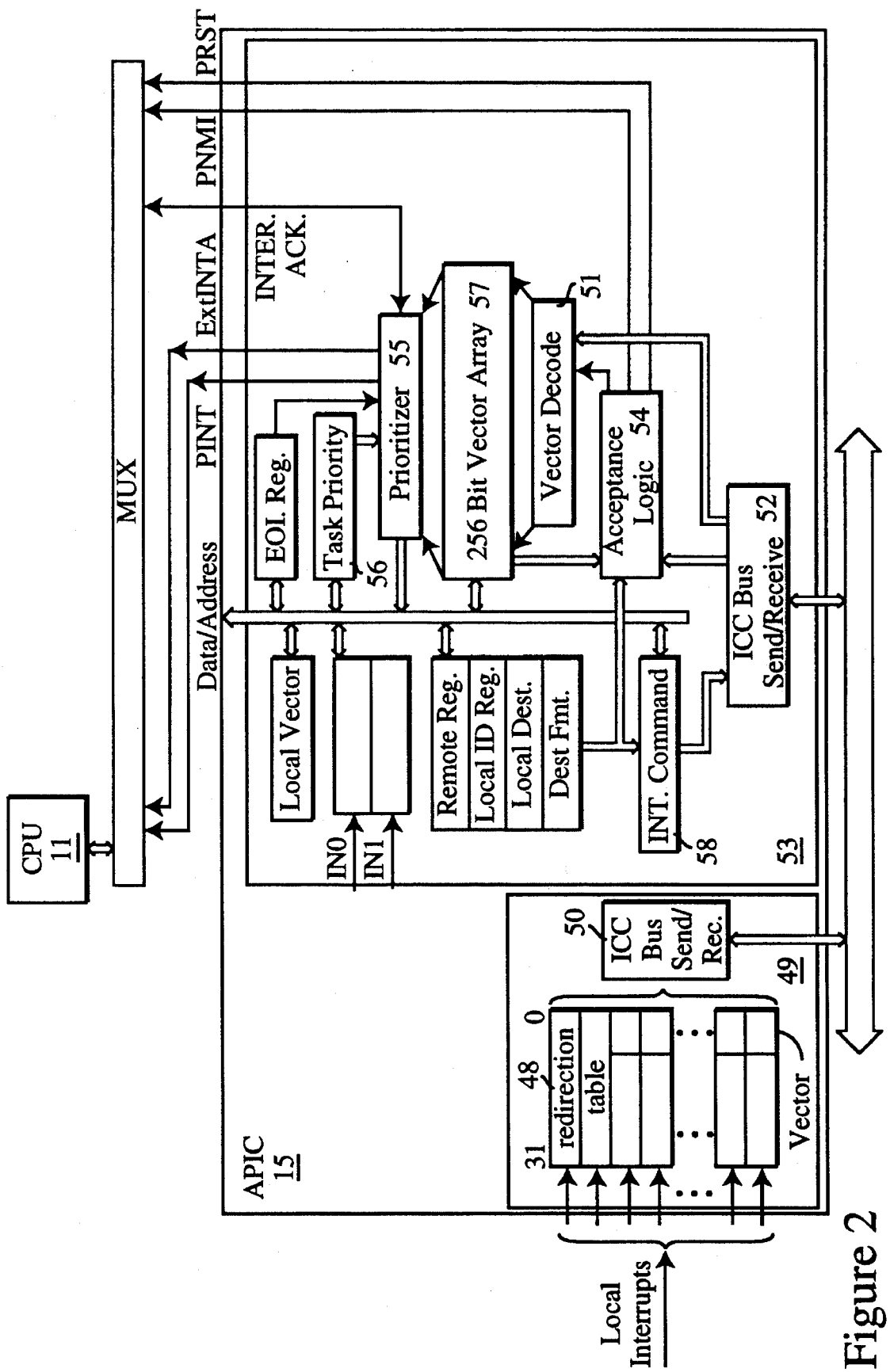
FIG. 2 is a block diagram of an APIC controller shown in FIG. 1 which has been used by the prior art and which may utilize the present invention.

FIG. 2 illustrates in more detail a single APIC controller 15 and a single central processor 11 from the circuit of FIG. 1. The various hardware and software interrupt signals which are generated in the system are routed directly to the input terminals of the APIC controller 15. The interrupt signals which might be received by the APIC controller at the various interrupt input terminals are assigned vectors by the system basic input/output startup (BIOS) routine at startup of the computer system of which the APIC controller is a part. These vectors designate the priority of each of the interrupts and thereby determine how they are to be treated by the APIC controller 15 during operation of the computer system. These interrupt vectors are stored in a redirection table 48 which is a portion of an input/output unit 49 of each APIC controller 15.

Locally generated interrupts are received at the input/output unit 49 of the APIC controller. Locally generated interrupts are provided at the input terminals illustrated to the left in the figure. Each of these interrupts is transferred to a particular input pin of the redirection table 48. As pointed out, the redirection table of the APIC controller 15 includes a plurality of registers each of which may store thirty-two bits of data which are typically generated by the system BIOS at startup. For each specific identifiable interrupt input signal which may be sent to the redirection table of the APIC controller 15 at a particular input terminal, the data stored in the register of the redirection table associated with that input signal includes various details of how the interrupt is to be handled by the APIC controller 15 and an eight bit interrupt vector which designates the address of that interrupt and its priority. As used in the prior art, these eight bits of the interrupt vectors provide 256 individual vectors for interrupts which are divided into sixteen different priority levels. This allows sixteen different interrupts to share each single priority level. However, in any particular system in which interrupts are assigned priority levels on an optimum basis, there will be only one interrupt assigned to any individual priority level. Any interrupt signal selects the interrupt vector stored in the redirection table 48 for that interrupt and formats an interrupt request message which includes the interrupt vector. The interrupt request message is then broadcast on the ICC bus by an ICC send/receive unit 50 which is a portion of the input/output unit 49 of each APIC controller 15.

The message broadcast on the ICC bus by the ICC send/receive unit 50 is received by an ICC bus send/receive unit 52 in a local unit 53 of each of the APIC controllers 15 connected on the ICC bus. The interrupt request messages received at an ICC bus send/receive unit 52 of the APIC controller 15 on the ICC bus are transferred to acceptance logic 54. The APIC controller 15 may be associated with a processor 11 to which the interrupt is addressed or it may be associated with a different processor 11. The controller 15 checks the address of the interrupt request message received with an address held in a local ID register or with an address held in a logical destination register to determine whether it is, in fact, the APIC controller 15 for the processor 11 which has been addressed.

In general, presuming that an interrupt is addressed to a processor 11 associated with a particular APIC controller 15, then the interrupt is accepted by the acceptance logic 54; and the vector is decoded by a vector decode table 51. The vector decoded is then transferred to a vector array 57 where it may be immediately handled by the processor 11 or placed in an interrupt queue under control of a prioritizer logic circuit 55 at a position depending on the priorities of other interrupts being handled by the APIC controller. The priority of a task presently being processed is held during processing in a task priority register 56 so that it may be compared to the priority of other interrupts received by the particular APIC controller 15 to determine whether the interrupt being processed should itself be interrupted by a higher priority interrupt.

When an interrupt is sent to the processor 11 by the APIC controller 15, the processor 11 reads the details of the vector decoded and obtains from the vector the entry point (an address in an interrupt vector table held in main memory) at which the address of the handler software process for the interrupt is stored. The processor 11 goes to the interrupt vector table in main memory to retrieve the address of the handler process and uses this address to access the interrupt handler process. Once the handler process is obtained, the interrupt is processed. When the interrupt is complete, the interrupt handler process sends back an end of interrupt (EOI) signal to the APIC controller.

It should be noted that the local processor 11 may inject interrupts into the system by writing an interrupt vector to an interrupt command register 58. Such an interrupt vector is similar to the vectors placed in the redirection table on start-up by the system BIOS. This procedure allows any processor to generate an interrupt vector for transmission to other processors in the computer system. The vector written to the interrupt command register 58 includes the identity of the interrupt being sent and its destination address. Writing the vector to the interrupt command register 58 causes an interrupt request message to be broadcast on the ICC bus to all APIC controllers on the ICC bus.

The interrupt vector transferred by each interrupt request message includes eight bits which designate the address of the handler process for the interrupt. Of these eight bits, the four most significant bits designate the priority of the interrupt while the four least significant bits designate the device or task initiating the interrupt. It will be apparent to those skilled in the art that the four bits provided for the priority value allow only sixteen distinct priorities to be selected. Not only are only sixteen levels of priority available in the prior art APIC architecture, but the lowest two priority levels which together include thirty-two of the 256 individual priority vectors have been reserved so that only the fourteen highest levels of priority are available. On the other hand, modern operating systems such as the Microsoft Windows NT operating system utilize thirty-two individual priority levels. Because of this, it has been necessary to provide the extra priority levels used by these systems through software techniques. These techniques slow the interrupt operation and present conditions in which data may actually be lost.

A second problem created by the addressing system utilized by the prior art for obtaining the handler processes is caused because the priority bits are the four most significant bits of the address. Because the four most significant bits are utilized, all interrupt handler processes for the same priority level are stored at sequential addresses in the interrupt vector table in main memory. That is, all sixteen possible individual interrupt handler processes for any single priority are stored in adjacent addresses in the interrupt vector table because their high order (most significant) address bits which designate priority are all identical. In most systems, it is desirable that each interrupt handler actually being used be assigned an individual interrupt level. To accomplish this using the prior art arrangement, each of the interrupt handler processes of a different priority level must be stored at an address which is at least sixteen addresses from the next closest handler process in the interrupt vector table.

On the other hand, using the older PIC controller, all of the interrupt handler processes used in a system have been stored in adjacent addresses in memory. Thus, a system using the PIC controller would store the handler processes for the sixteen interrupt levels of interrupts at sequential addresses in a very small area of main memory. The memory addresses at which interrupt handler processes have been stored in computer systems using Intel processors are well known, and a software designer must avoid these areas of memory in creating usable software. More importantly, those areas not used by the interrupt handler processes are also well known and have been used by many software applications designed for the Intel computer systems. This creates a major problem. First, the number of addresses for handler processes which must be made available with more modern operating systems requires a much larger area of main memory than did the handler processes of the prior art arrangement. Then, because of the prior art arrangements for addressing these handlers using the APIC controller, sixteen individual interrupt handler processes having sixteen different levels of priority must lie at widely separated addresses of an interrupt vector table in main memory since all interrupt handlers for the same priority lie at adjacent sequential addresses.

FIG. 3 illustrates the memory mapping in the interrupt vector table of addresses for the interrupt handler processes for a particular APIC controller and processor used in the prior art. The wide distribution of addresses in memory utilizes memory positions which have previously been available to application programs. Using these widely distributed addresses thus interferes with compatibility of older programs and processes. Since providing additional levels of priority using this addressing arrangement requires the use of work-around software, this arrangement also significantly slows the operation of accessing the interrupt handler processes.

Figure 4:
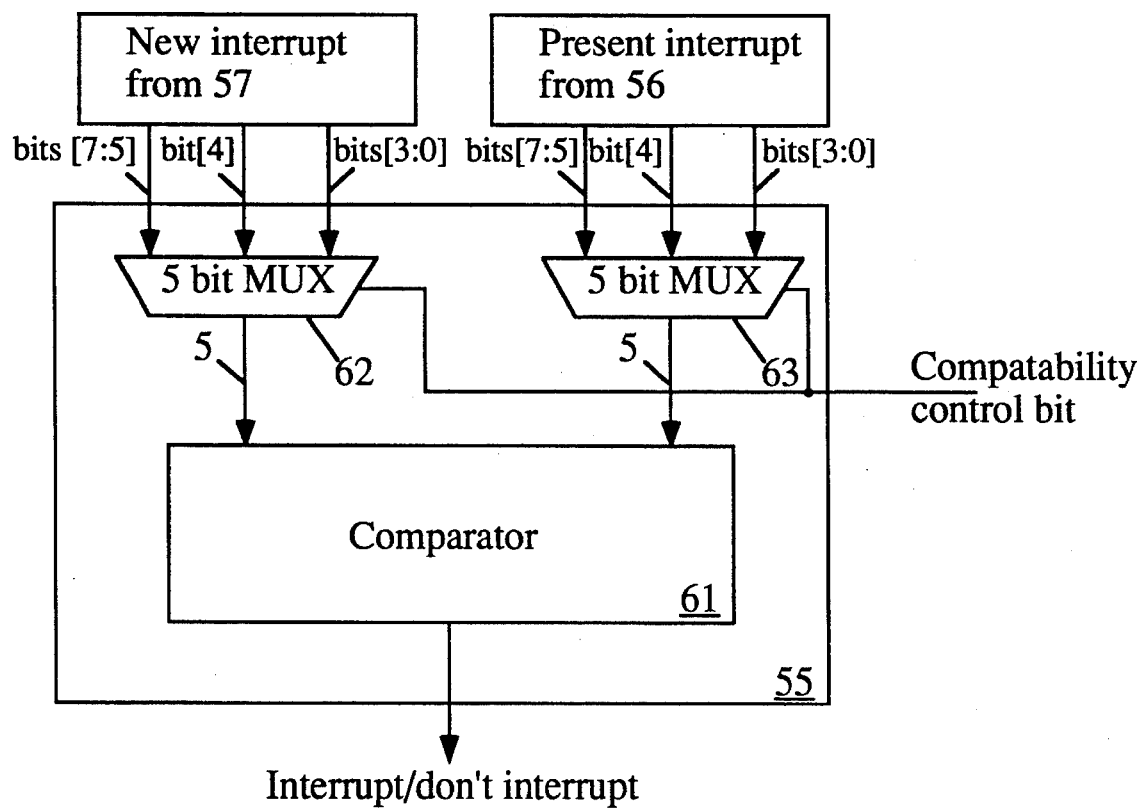
FIG. 4 is a circuit diagram illustrating improvements which may be made to the circuit of FIG. 2 in order to practice the present invention.

An arrangement has now been discovered by which the APIC controller may be modified to provide thirty-two individual levels of interrupt priority while associating the addresses for the handler processes for those thirty-two levels in closely adjacent positions in the interrupt vector table in main memory so that they do not intrude on areas of main memory previously used by application programs. FIG. 4 illustrates a portion of an improved interrupt controller based on the APIC controller design. FIG. 5 is an illustration of the memory mapping provided for addresses of interrupt handlers using the present invention. The improved controller of the present invention overcomes the problems discussed above with regard to the APIC controller by providing thirty-two individual levels of priority and by mapping the addresses of handlers for the vectors relating to the same device or task and having different priority levels adjacent one another in the interrupt vector table.

As may be seen in the FIG. 5, the interrupt vector table illustrated provides the same 256 individual interrupt vector entries. However, the addressing scheme for the table is such that the last five bits (the least significant bits) of the address of each handler process are utilized to encode the priority of the interrupt. The provision of five bits allows the encoding of a total of thirty-two individual priority levels which may be assigned to any interrupt. Additionally, this mapping of addresses is such that even though the same number of addresses are available for interrupt handlers, a total of thirty-two individual priority levels are available at adjacent sequential addresses in main memory since addresses contain the priority level in the least significant five bits. That is, since sequential addresses vary from one another in the lowest order bits which designate priority in the present invention, each of thirty-two sequential addresses which may be used for interrupt handlers will have different priority levels. Thus, in the typical system where some number such as thirty-two individual interrupt handlers may actually be utilized, these handlers may all be placed in adjacent addresses in the interrupt vector table of main memory. Moreover, these adjacent addresses may be programmed to cover those addresses used in previous generations of computers using Intel processors for interrupt handler processes so that the addresses are not addresses which have typically been used by application or other non-operating system programs. In this manner, compatibility with older software is attained.

Figure 6:
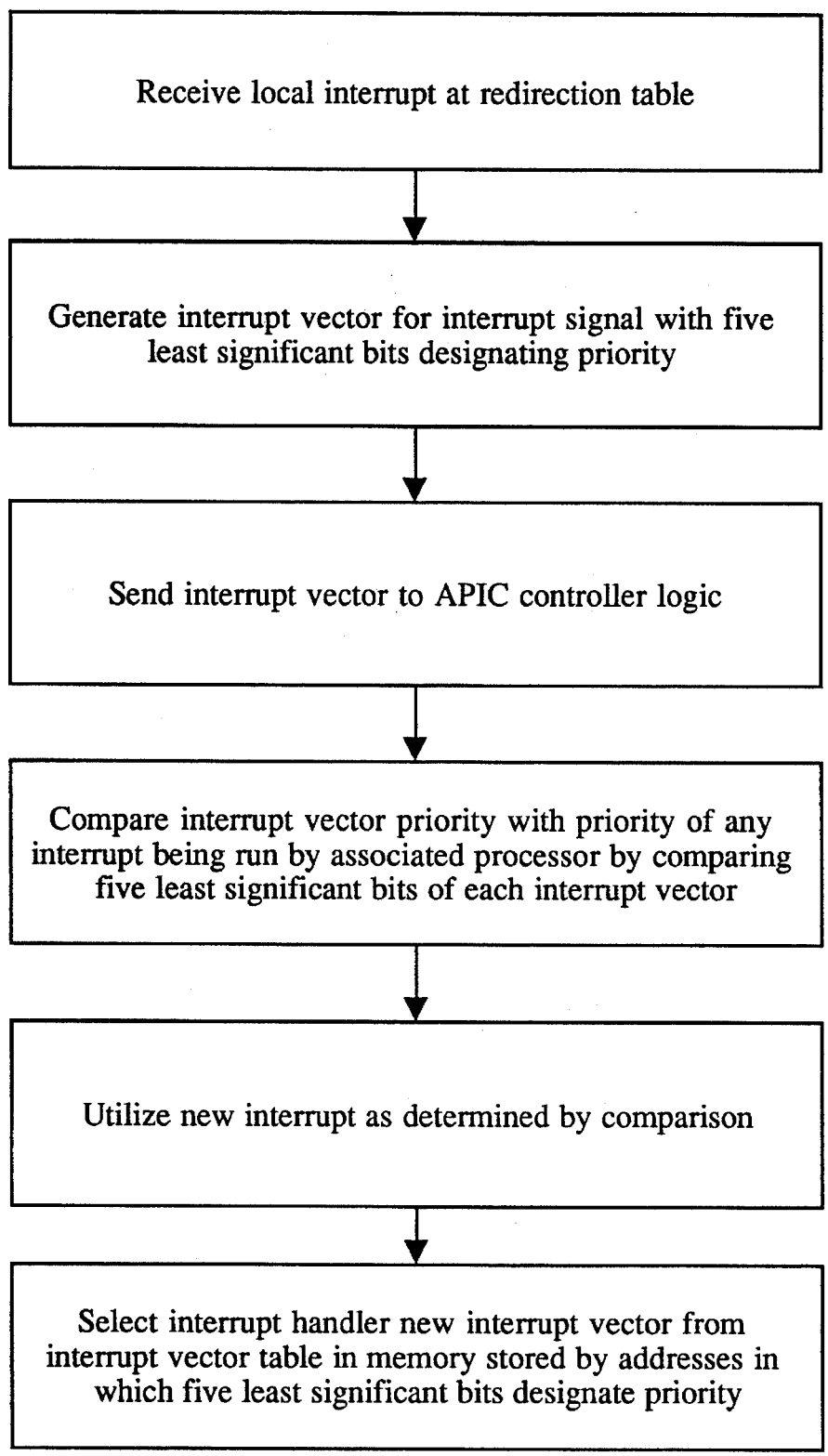
FIG. 6 is a flow chart illustrating a method of practicing the present invention.

FIG. 4 illustrates a portion of an APIC controller 15 which has been modified so that it may be utilized to practice the present invention. FIG. 6 illustrates a method practiced in carrying out the present invention utilizing the modified APIC controller. In order to accomplish its operations outlined above, the prior art APIC controller includes in its prioritizer 55 a four bit comparator which compares the priority level of any presently running interrupt (stored in the task priority register 56) with the priority of a new interrupt just being presented (held in the bit vector array 57) by comparing the highest four (priority) bits of each. The result of this comparison is that if the new interrupt has a higher priority than the priority of the interrupt presently running, the new interrupt interrupts the presently running interrupt. On the other hand, if the new interrupt has a lower priority level, it is simply placed in the queue for processing.

This circuitry is modified in the present invention by providing a larger comparator 51, one which is able to compare a total of five bits rather than four, and which may be controlled to select for comparison either the four highest order bits in the manner of the prior art or the five lowest order bits of the address utilized by the priority mechanism of the present invention. This comparator is connected to receive five bit inputs from each of a pair of multiplexors 52 and 53. The multiplexor 52 receives all eight bits from the new interrupt and transfers the four highest order bits or the five lowest order bits to the comparator 51 depending on a compatibility control bit which signals whether the new or old priority mechanism is being implemented. If the new priority arrangement using the lowest five bits for designating the priority level is being used in the computer system, then the control signal causes the multiplexor 52 to transfer the lowest five bits. If the older priority designation system is being used, then the control signal causes the multiplexor 52 to transfer the highest four bits. Similarly, the multiplexor 53 receives all eight bits from the presently running interrupt and transfers the highest four or the lowest five of those bits to the comparator 51. If the new arrangement using the lowest five bits for designating the priority level is being used in the computer system, then the control signal causes the multiplexor 53 to transfer the lowest five bits. If the older priority designation system is being used, then the control signal causes the multiplexor 53 to transfer the highest four bits. This arrangement using multiplexors 52 and 53 allows the improved APIC controller of the present invention to be used with either a new or an older operating system for designating the priority of interrupts. As with the older system, the result of the comparison by the comparator 51 is that if the new interrupt has a higher priority than the priority of the interrupt presently being run, the new interrupt interrupts the presently running interrupt. On the other hand, if the new interrupt has a lower priority level, it is simply placed in the queue for processing.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An improved advanced programmable interrupt controller (APIC controller) comprising:

an input/output unit comprising a redirection table with a plurality of registers for storing eight bit programmable interrupt vectors indicating an address of an interrupt in memory and its priority, communications circuitry, coupled to said input/output unit, to transfer a message containing said interrupt vector, logic circuitry, coupled to said communications circuitry, to determine if a message being transferred containing an interrupt vector is directed to said APIC controller, and prioritization circuitry, coupled to said logic circuitry, to prioritize said interrupt vectors in an order based on a priority level which is encoded in five least significant bits of the interrupt vector.

2. An improved APIC controller as claimed in claim 1 in which:

said APIC controller is coupled to a processor, and is operable to provide said interrupt vectors to said processor in said priority order; and said prioritization circuitry comprises a comparator for comparing five least significant bits of any interrupt vector in a message received by an APIC controller with five least significant bits of any interrupt vector presently being handled by said processor.

3. An improved APIC controller as claimed in claim 2 wherein said processor handles said interrupt vectors in said priority order.

4. An improved APIC controller as claimed in claim 3 in which said processor comprises a comparator for comparing five least significant bits of any interrupt vector in a message received by said APIC controller with the least five significant bits of any interrupt vector presently being executed by said processor.

5. An improved APIC controller as claimed in claim 1 in which said prioritization circuitry comprises:

a first multiplexor connected to receive said interrupt vectors in said received message by said APIC controller, a second multiplexor connected to receive interrupt vectors presently being handled under control of said APIC controller, and control circuitry for causing the first and second multiplexors to transfer the four most significant bits of said interrupt vectors furnished to the first and second multiplexors to said comparator instead of the five least significant bits.

6. An improved advanced programmable interrupt controller (APIC controller) comprising:

a plurality of means for storing eight bit programmable interrupt vectors indicating an address of an interrupt in memory and its priority, means, coupled to said storing meads, for transferring a message containing one of said interrupt vectors, logic means, coupled to said transferring means, for determining if said message being transferred is directed to an APIC controller and means, coupled to said logic means, for executing interrupt vectors in an order based on a priority level which is encoded in five least significant bits of said interrupt vector.

7. An improved APIC controller as claimed in claim 6 in which said execution means comprises comparator means for comparing five least significant bits of any interrupt vector in a message received by said APIC controller with five least significant bits of any interrupt vector presently being executed by said execution means.

8. An improved APIC controller as claimed in claim 6 further comprising:

means for executing interrupt vectors in an order based on a priority level which is encoded in four most significant bits of the interrupt vector.

9. An improved APIC controller as claimed in claim 8 in which said executing means comprises comparator means for comparing five least significant bits of any interrupt vector in a message received by an APIC controller with five least significant bits of any interrupt vector presently being executed by said execution means.

10. An improved APIC controller as claimed in claim 9 in which said execution means comprises:

first multiplexor means connected to receive interrupt vectors in a message received by said APIC controller, second multiplexor means connected to receive interrupt vectors presently being executed under control of said APIC controller, and means for causing the first and second multiplexors to transfer either four most significant bits or five least significant bits of interrupt vectors furnished to the first and second multiplexors to the comparator.

11. A computer system comprising:

a central processing unit;

main memory;

a bus for transferring data, addresses, and control signals; and an improved advanced programmable interrupt controller (APIC controller) connected to receive signals on the bus and to transfer interrupt signals to the central processing unit comprising:

an input/output unit including a redirection table with a plurality of registers for storing eight bit programmable interrupt vectors indicating an address of an interrupt in memory and its priority, circuitry for transferring a message containing an interrupt vector, logic circuitry for determining if a message being transferred containing an interrupt vector is directed to said APIC controller, and circuitry for executing interrupt vectors in an order based on a priority level which is encoded in five least significant bits of the interrupt vectors.

12. A computer system as claimed in claim 11 in which the circuitry for executing interrupt vectors in an order based on a priority level which is encoded in five least significant bits of the interrupt vector comprises a comparator for comparing five least significant bits of any interrupt vector in a message received by said APIC controller with five least significant bits of any interrupt vector presently being run under control of said APIC controller.

13. A computer system as claimed in claim 11 wherein said execution circuitry is further operable to execute interrupt vectors in an order based on a priority level which is encoded in four most significant bits of the interrupt vector.

14. A computer system as claimed in claim 13 in which said execution circuitry comprises a comparator for comparing five least significant bits of any interrupt vector in a message received by an APIC controller with five least significant bits of any interrupt vector presently being executed under control of said APIC controller.

15. A computer system as claimed in claim 14 in which said execution circuitry comprises:

a first multiplexor connected to receive interrupt vectors in a message received by said APIC controller, a second multiplexor connected to receive interrupt vectors presently being executed under control of said APIC controller, and control circuitry for causing the first and second multiplexors to transfer four most significant bits of interrupt vectors furnished to the first and second multiplexors to the comparator instead of five least significant bits.

16. A computer system comprising:

a central processing unit;

main memory;

a bus, coupled to the central processing unit and to the main memory, for transferring data, addresses, and control signals; and an improved advanced programmable interrupt controller (APIC controller) coupled to receive signals on the bus and to transfer interrupt signals to the central processing unit comprising:

- a plurality of means for storing eight bit programmable interrupt vector indicating an address of an interrupt in memory and its priority,
- means for transferring a message containing an interrupt vector,
- logic means for determining if a message being transferred containing an interrupt vector is directed to an APIC controller, and
- means, coupled to the central processing unit and to the logic means, for executing interrupt vectors in an order based on a priority level which is encoded in five least significant bits of the interrupt vector.

17. A computer system as claimed in claim 16 in which the execution means comprises comparator means for comparing five least significant bits of any interrupt vector in a message received by an APIC controller with five least significant bits of any interrupt vector presently being run by the central processing unit.

18. A computer system as claimed in claim 16 further comprising: means, coupled to the central processing unit and to the logic means, for executing interrupt vectors in an order based on a priority level which is encoded in four most significant bits of the interrupt vector.

19. A computer system as claimed in claim 18 in which the means for executing interrupt vectors in an order based on a priority level which is encoded in five least significant bits of the interrupt vector comprises comparator means for comparing five least significant bits of any interrupt vector in a message received by the APIC controller with five least significant bits of any interrupt vector presently being executed under control of the APIC controller.

20. A computer system as claimed in claim 19 in which the execution means comprises:

- first multiplexor means connected to receive interrupt vectors in a message received by the APIC controller,
- second multiplexor means connected to receive interrupt vectors presently being executed under control of the APIC controller, and
- means for causing the first and second multiplexors to transfer either four most significant bits or five least significant bits of interrupt vectors furnished to the first and second multiplexors to the comparator.

21. A method for processing interrupts in a computer system including a central processing unit; main memory; a bus for transferring data, addresses, and control signals; and an improved advanced programmable interrupt controller (APIC controller) connected to receive signals on the bus and to transfer interrupt signals to the central processing unit comprising the steps of:

- receiving an interrupt signal at a redirection table of the APIC controller,
- generating an interrupt vector for the interrupt signal with the five least significant bits designating the priority of the interrupt signal,
- sending the interrupt vector to the APIC controller,
- comparing the priority within the received interrupt vector with the priority of any interrupt vector being executed under control of the APIC controller by comparing the five least significant bits of each interrupt vector, and
- executing the received interrupt vector in accordance with the comparison.

* * * * *

UNITED STATES PATENT AND TRADEMARK OFFICE
CERTIFICATE OF CORRECTION

PATENT NO. : 5,511,200
DATED : April 23, 1996
INVENTOR(S) : Muthurajan Jayakumar It is certified that error appears in the above-identified patent and that said Letters Patent is hereby corrected as shown below:

In column 9 at line 46 delete "meads" and insert --means--

Signed and Sealed this

Twenty-ninth Day of April, 1997

Attest:

BRUCE LEHMAN

Attesting Officer

Commissioner of Patents and Trademarks